(No Model.)  4 Sheets—Sheet 1.

W. WATSON.
MACHINE FOR WASHING FIBROUS MATERIAL.

No. 565,581. Patented Aug. 11, 1896.

*Fig. 1.*

Witnesses.
Guy E. Davis.
B. W. Miller.

Inventor.
William Watson
By his Attorneys
Baldwin Davidson & Wight

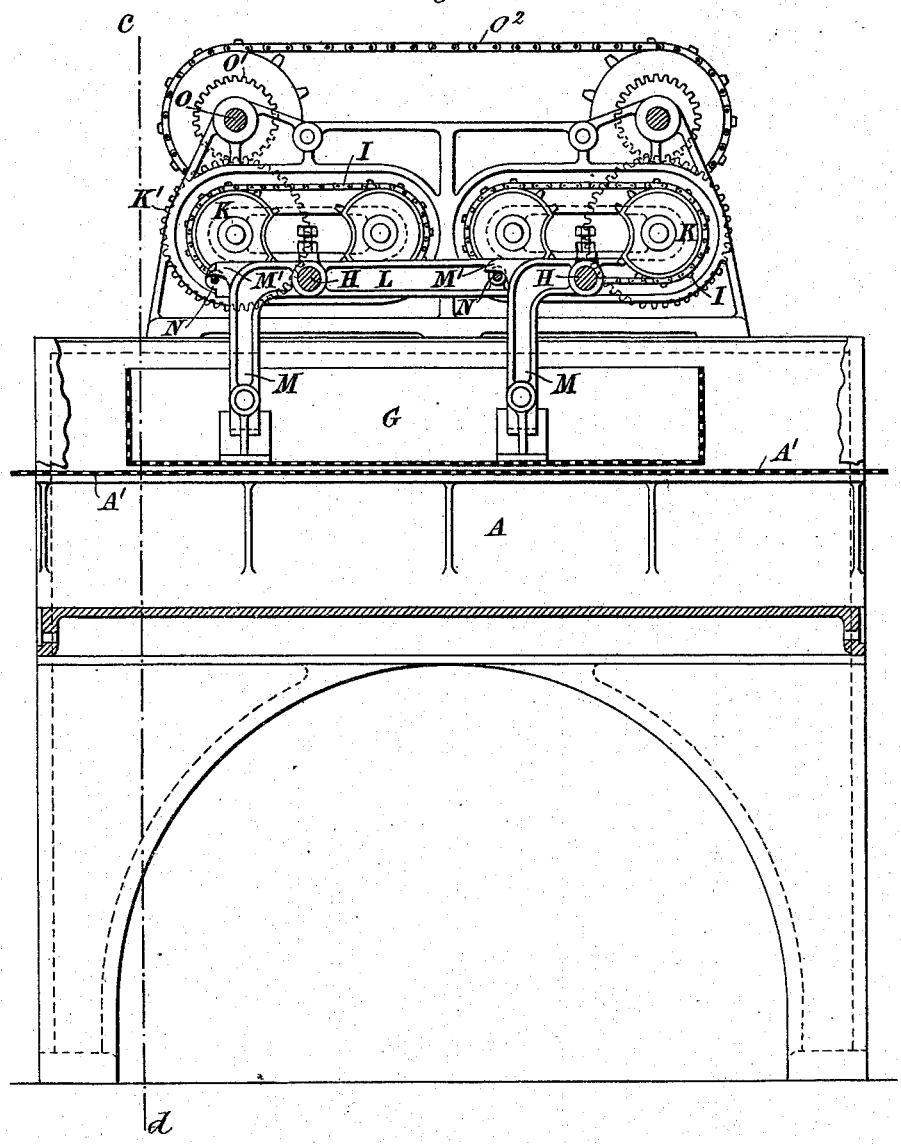

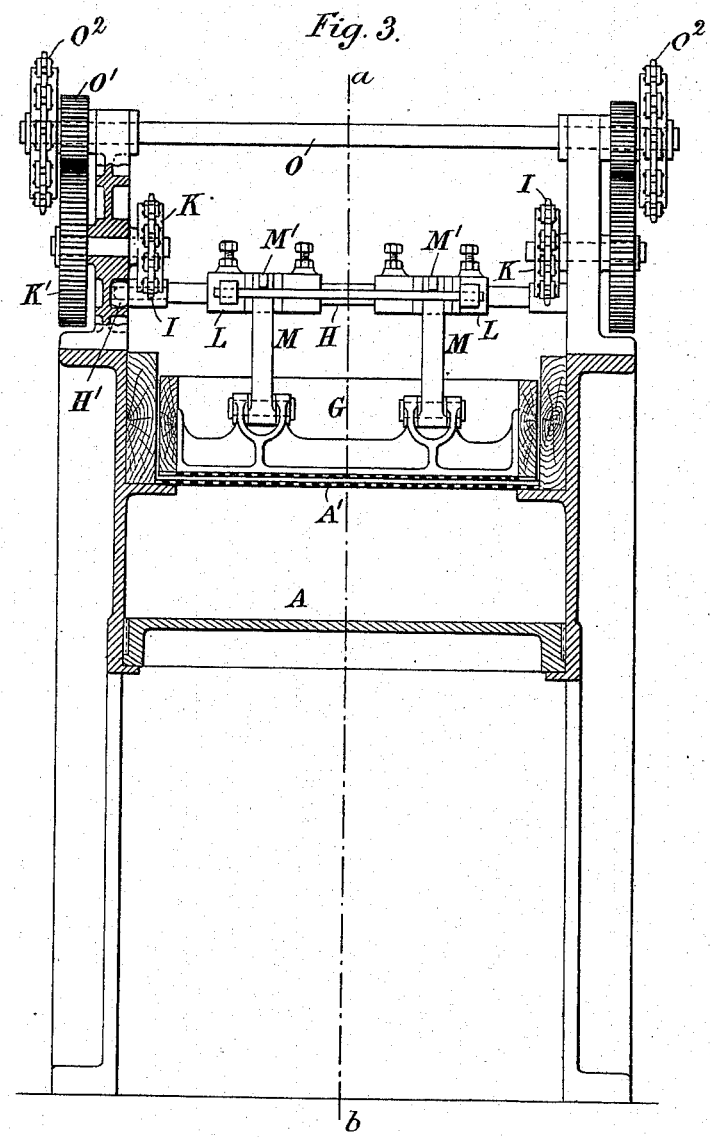

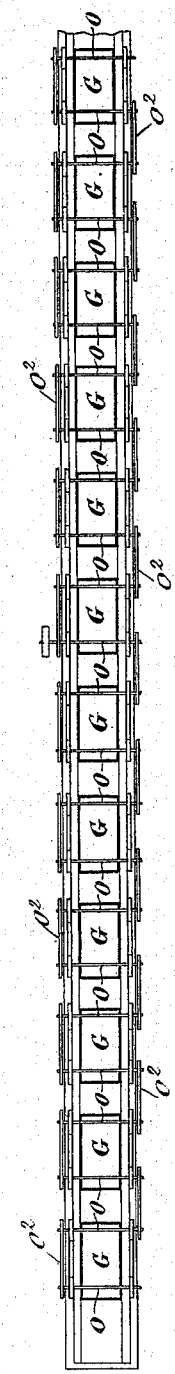

UNITED STATES PATENT OFFICE.

WILLIAM WATSON, OF BRADFORD, ENGLAND.

MACHINE FOR WASHING FIBROUS MATERIAL.

SPECIFICATION forming part of Letters Patent No. 565,581, dated August 11, 1896.

Application filed February 21, 1896. Serial No. 580,195. (No model.)

*To all whom it may concern:*

Be it known that I, WILLIAM WATSON, a managing director of Messrs. Lister & Co., Limited, a subject of the Queen of Great Britain, residing at Manningham Mills, Bradford, in the county of York, England, have invented certain new and useful Improvements in Machinery for Washing Silk, Wool, or other Fibrous Material, of which the following is a specification.

According to this invention I construct a washing-machine of a long trough open at the top. The trough I form with a perforated false bottom, and by a centrifugal or other pump supply water to the trough below the perforated false bottom. The water rises up through all the perforations into the upper part of the trough and passes from it at one end back again into a tank, from which it is again drawn by the pump. The tank thus acts as a settling-tank in which the heavier dirty matters carried off by the water may be deposited. The silk to be washed is placed into the trough at one end and is gradually dragged along it, while at the same time the silk is rubbed and moved up and down in the water. At the opposite end the silk is raised up out of the trough and is discharged.

One way in which I effect the moving forward of the silk along the trough is as follows: Over the top of the trough I suspend a number of perforated, or it might be unperforated, horizontal plates or boxes with perforated or unperforated bottoms in such a way that they can be raised and lowered and moved horizontally to and fro in a direction lengthwise of the trough, being moved in one direction when they have been lowered into the trough and in the opposite direction when raised out from it. In this way the silk gets moved up and down in the water and rubbed between the plates and the perforated false bottom of the trough, while at the same time it is made to travel gradually from one end of the trough to the other.

The drawings annexed show various views of a machine constructed according to my invention.

Figure 1 is a side elevation, mostly in section. Fig. 2 is a similar view of one length or section of the same, taken on the line $a\ b$ of Fig. 3. Fig. 3 is a transverse vertical section taken on the line $c\ d$ of Fig. 2. Fig. 4 is a diagram plan view showing the way in which the endless chains which impart motion to the plates or boxes are all caused to revolve in the same direction.

A is the long trough, having within it a perforated false bottom A'. In Fig. 1 the trough is shown to be made up of a number of lengths or sections, each formed in the manner shown at Figs. 2 and 3. The fibrous material is fed into the trough at one end and delivered at the opposite end. At this end a pair of squeezing-rollers B is provided to squeeze out water from the fibrous material as it comes from the trough. These rollers are not in all cases required.

C is a partition across the trough below the perforated false bottom and near the exit end. D is a pipe leading from the bottom of this end of the trough and having cocks D' upon it by which all wash-waters which pass away through it can be discharged into any one or other of a number of vats E. In Fig. 1 four such vats are shown. This is a convenient number, as it admits of suds or wash-waters being prepared in two of them while suds or wash-waters from the other two are being circulated through the trough.

F F are pumps for drawing wash-waters from the vats and delivering them through the pipes F' into the trough below the perforated false bottom.

G G are boxes with perforated bottoms. They are mounted above the perforated false bottom of the trough in such a way that they are continuously moved to and fro in a direction lengthwise of the trough, and also raised and lowered. Various means may be adopted for giving these movements to the boxes. In the arrangement shown in the drawings they are each suspended from two rods H H, which are at right angles to the trough and near their ends are secured to endless chains I, each of which works around a pair of chain-wheels K.

L L are bars passing from one rod H to the other.

M M are bent links jointed at their lower ends to the boxes and having the rods H passing through their upper ends. Each link at its upper end has also a projection M' standing out from it. This rests on a rod N, which passes through and is carried by the bars L. In this way the boxes are kept from swinging to and fro.

H' are trucks on the ends of the rods H. They run in grooved channels formed in the side frames of the machine. Each chain-wheel K is recessed at one point of its circumference to allow the rod H to pass around it.

A toothed wheel K' on the axis of one or other of each pair of chain-wheels K is driven continuously by a toothed wheel O' on a shaft O. Motion is communicated from one shaft O to the others by endless chains $O^2$, passing around chain-wheels fast upon them, so that all are driven in the same direction, and when one is driven all the rest revolve with it. The one that is first driven is preferably one that is situated near the center of the machine. In this way as the pairs of chain-wheels are revolved the boxes G G are all raised and lowered and moved horizontally to and fro, and it is arranged that the lifting of each box shall take place at a different time to that of the boxes next to it. It may be arranged so that when any one is lifted the others on either side of it are lowered, or they may be otherwise set, so that the boxes are raised and lowered at different times.

As each box is lowered down into the trough some of the fibrous material that is being washed gets more or less held between the perforated bottom of the box and the perforated false bottom of the trough, and as the box is then moved horizontally the fiber thus held is rubbed and made to travel along the trough, and when the box rises the fiber which was previously being squeezed and rubbed is again lifted up and loosened out by the flow of water rising up through the perforated false bottom of the trough. This goes on continuously until the fibers have been made to travel from one end of the trough to the other and have been discharged from it.

Other means than those described may be employed for giving a rising and falling and horizontal to-and-fro movement to the boxes. The means described are, however, very suitable for the purpose.

What I claim is—

1. A washing-machine comprising a long open trough having a perforated false bottom, means for causing a continuous flow of wash-water to pass up through the perforated false bottom, means for drawing off the wash-water from the trough, a series of plates above the perforated false bottom, and means for moving the plates horizontally lengthwise of the trough and for also raising and lowering the plates to squeeze the material operated upon between them and the false bottom.

2. In a machine for washing silk and other fibrous material, the combination of a long trough open at the top and having a fixed perforated false bottom completely separating the upper part of the bath from the lower part, means for causing a continuous flow of wash-water to pass up through the false bottom, an outlet for carrying away wash-water from one end of the trough, a series of perforated plates above the false bottom, and means for moving the plates horizontally lengthwise of the trough and for also causing these plates to descend and squeeze the material operated upon against the false bottom.

3. The combination of the long trough open at the top and having a fixed perforated false bottom, means for supplying a continuous flow of wash-water into the closed space below this perforated false bottom, the series of plates or boxes, the pairs of rods from which each plate or box is suspended, the pairs of endless chains to which the ends of the two rods of each pair of rods are connected, the chain-wheels around which the endless chains work and means for driving the endless-chain wheels all in the same direction, substantially as described.

WM. WATSON.

Witnesses:
CHAS. WM. ROBERTS,
S. E. DEAN.